Oct. 29, 1968

W. H. COX 3,408,622

METHOD AND APPARATUS FOR THE PRODUCTION
OF SEISMOGRAPHIC RECORDS

Filed May 19, 1967

INVENTOR
WILLIAM H. COX

BY Busser, Smith & Harding
ATTORNEYS

Oct. 29, 1968

W. H. COX 3,408,622

METHOD AND APPARATUS FOR THE PRODUCTION OF SEISMOGRAPHIC RECORDS

Filed May 19, 1967

INVENTOR
WILLIAM H. COX
BY
*Busser, Smith & Howley*
ATTORNEYS

United States Patent Office 3,408,622
Patented Oct. 29, 1968

3,408,622
METHOD AND APPARATUS FOR THE PRODUCTION OF SEISMOGRAPHIC RECORDS
William H. Cox, Beaumont, Tex., assignor to Sun Oil Company, Philadelphia, Pa., a corporation of New Jersey
Filed May 19, 1967, Ser. No. 639,871
10 Claims. (Cl. 340—15.5)

ABSTRACT OF THE DISCLOSURE

A pair of shots are detonated at different depths, and a separate record is made of each shot. The records are then read simultaneously to produce a pair of electrical signals, but they are adjusted so that corresponding ghosts from each shot are aligned and appear simultaneously as electrical signals. These signals are subtracted from each other to cancel the ghosts. Because of the difference in shot depths, the desired reflections are not aligned and a distorted signal is produced by the subtraction of the desired signal resulting from one shot from the desired signal resulting from the other shot. The desired signal is obtained from the distorted signal by passing it through a specially designed filter which corrects the phase and amplitude distortion resulting from subtractive mix of the desired signals.

Background of the invention

This invention relates to a method and apparatus for the production and improvement of seismographic records produced in seismographic prospecting, and particularly to the elimination on a final record of one of two overlapping signal components.

In seismic prospecting, one or more explosive charges are detonated below the surface of the earth, and reflections are detected by a suitable seismic detector or "geophone." The output of the geophone is caused to modulate a steady alternating signal which is subsequently recorded, for example, on magnetic tape. Reflections which do not travel directly to one reflecting interface and back to the surface cause a difficulty in interpretation of the record. The undesired indirect reflections are known as shot ghosts or multiple reflections, and, on the record, they may be misinterpreted as desired primary reflections, or they may distort the desired reflections beyond recognition.

It is conventional practice to combine seismic records from shots at more than one depth or with more than one path for the reflected signal covering the same subsurface area. These records are summed or "mixed" with adjustments to cause desired signal components to coincide in time for maximum reinforcement. Other signal components will not coincide. It is possible by choice of shot depths to cause maximum interference between shot ghosts from two different records but not complete cancellation. The relative amplitude of primary reflections to multiple reflections can be increased by summing records which cover the same subsurface with widely different signal paths. Four or more shots per output trace are needed, however, for significant improvement in the ratio of the amplitude of the desired signal to the amplitude of the undesired reflections.

Summary of the invention

In accordance with the invention, a geophone receives many spurious signals preceding, following and overlapping the desired signal. The signals result from more than one reflection at interfaces below the earth surface and at the earth's surface.

When a shot is detonated in a borehole, the desired signal travels along a path downwardly to the reflecting interface of interest, and then upwardly to the detecting apparatus. This reflecting interface is ordinarily at a great depth below the shot level. A reflection from this shot may also travel along an upward path from the shot level to a reflecting interface above the shot, and then downwardly to the interface of interest and then upwardly again to the detecting apparatus. This is a ghost reflection.

By way of example, if an explosive charge is detonated below the surface of the earth but above the interface from which it is desired to reflect a signal, the desired reflection would first reach the detecting apparatus. A ghost reflection might take place downwardly off the earth's surface and upwardly off any interface below the surface. Since the differences in arrival times between these reflections are of the order of the duration of the desired signal, these signals will interfere with each other, and a sum of these reflections appears on the record so that the desired signal is practically unrecognizable. Other reflections might occur first at an interface above the shot, and might be reflected back and forth several times before they reach the detector. Any reflection taking place first at an interface above the shot is eliminated by the invention.

In accordance with the invention, the shot levels are desirably deep so that the angles between the paths of the various reflections and the vertical are small. The differences in the path lengths between corresponding signals from different shots are then substantially equal to the distance between the shot depths. As will be explained subsequently in detail, where a pair of shots are made, one after the other, at different depths, the differences between the relative arrival times of the ghosts with respect to the desired primary reflections can be calculated and are determined by the time of travel between the level of the first shot and the level of the second shot. It follows that, if a ghost resulting from the first shot follows the desired primary reflection resulting from the first shot by a first given time delay, and the corresponding ghost resulting from the second shot follows the primary reflection resulting from the second shot by a second given time delay, the difference between these time delays is a function of the vertical travel time between the shots.

The time differences can be most conveniently obtained by determining the uphole travel time for each shot by the use of a special geophone at the surface near the shot hole. The difference in the vertical travel time for each shot is determined by subtracting the travel times, and this method takes into account differences in velocity in the subsurface strata. On the final record, when the ghosts are aligned, the primary reflections will be separated by a time interval corresponding to twice the difference between uphole travel times for the two shots.

In accordance with the invention, a first record is made of the reflections resulting from the first shot. A second record is made of the reflections resulting from the second shot which takes place above the first shot.

The records produced are simultaneously read by electromagnetic pickups followed by a demodulator, the output of which is a pair of signals, one corresponding to the reflections resulting from the first shot, and the other corresponding to the reflections resulting from the second shot. The direct unreflected signals, which may be more easily identified on the recording media because of their amplitudes, are aligned with each other by displacing the records with respect to each other. As will be seen from the detailed description to follow, this results in an exact alignment of the corresponding undesired reflections resulting from the first and second shots. The desired primary reflections are then separated by a known amount, which corresponds to twice the time required for a seismic wave to travel through the vertical distance between the first and second shots.

The output of the first recording medium is subtracted from the output of the second recording medium by electrical means, and the ghosts from the first shot interfere with the corresponding ghosts resulting from the second shot so that the output of the subtracting means contains only residual noise, reverberations, and most important, a pair of wavelets representing the desired primary reflections which are displaced in time and opposite in polarity. The time displacement between these wavelets is ordinarily less than the duration of a wavelet, so that they interfere with each other forming a particular wavelet usually having an unrecognizable form. In accordance with this invention, the output of the subtracting apparatus can be operated on to recover a wavelet which is of the same form as a single desired reflection. The output of the subtracting apparatus is therefore fed into a special filter which reshapes the wavelet so that the original form of the desired primary reflection is recovered.

The operation of the filter takes advantage of the fact that subtractive interference of a pair of identical wavelets with time displacement results in a wavelet which corresponds to one original wavelet with amplitude and phase distortion. The filter has to correct this distortion.

The output of the filter may then be recorded and analyzed.

Although the invention is specifically described with reference to the production of seismic records from a pair of shots detonated at different depths in a single shot hole, it will be understood that it is applicable as well to the production of final records from a pair of records made separately from successive shots, the reflections from which travel through different paths to the detecting apparatus. Multiple reflections can be eliminated from the final records, since, on the two shot records, they will be separated from the desired primary reflection by different time intervals.

The main object of this invention, therefore, is to provide a method and apparatus for eliminating undesired reflections from a seismic record.

Other objects will be apparent from the following description read in conjunction with the accompanying drawings.

*Description of the preferred embodiment*

Figure 1:
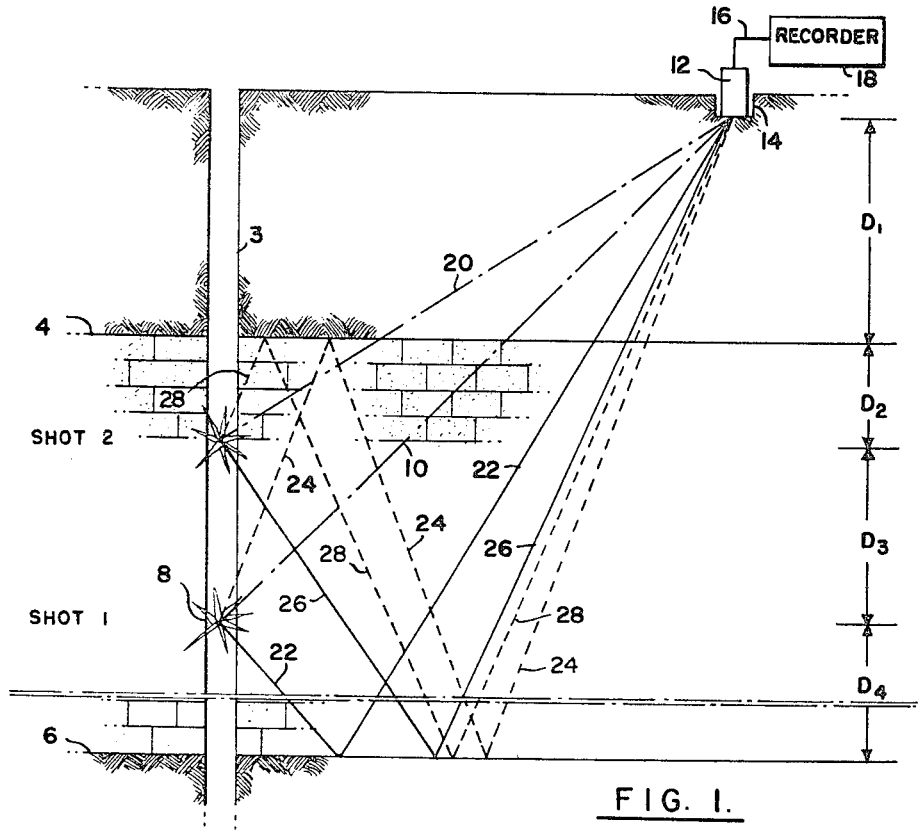
FIGURE 1 is a partially diagrammatic illustration of a section of the earth which shows various paths of travel of waves between points of detonation and a seismic detector, the horizontal scale of this figure being much greater than the vertical scale.

In order to understand the operation of the apparatus of this invention, reference should be made to FIGURE 1, which shows a vertical section of the earth having a shot hole 3 extending downwardly therethrough, and passing through several different earth formations, boundaries of these formations being indicated at 4 and 6. It will be understood that this illustration is greatly simplified, in that reflections from other interfaces are purposely ignored and more complex paths involving several reflections are not shown. While the illustration is simplified, it will become apparent that the invention is applicable to eliminate these reflections if they first travel upwardly from the shot level.

A first shot is detonated at a low position in the borehole, and the explosion caused thereby is indicated at 8. A path 10 is shown of the wave moving directly without reflection to a geophone 12. Geophone 12 is positioned near the surface of the earth in a depression 14, and a cable 16 delivers signals from the detector to a recorder 18, which may include the means producing a comparatively high frequency signal and the modulating means mentioned previously.

It is, of course, to be understood that the distance between the level of shot 1 and the detector level is such that the travel of the wave along path 10 is actually on a small angle relative to the vertical. All of the paths indicated are likewise at small angles relative to the vertical and are shown otherwise only for the purpose of distinguishing one from another. Path 20 is the direct path of travel of a wave resulting from shot 2 to the detector. Since paths 10 and 20 are, in reality, almost vertical, the difference in their lengths can be treated as equal to the distance between the level of shot 1 and the level of shot 2, this distance being indicated as $D_3$.

The shot at the lower level in the borehole is detonated first, since it can cause collapse of the borehole at or around this level. The second shot is made at a higher level where the borehole is undamaged. The distance between the shots is typically of the order of 75 feet, so that the time required for the wave to travel through the distance between the shots is of the order of several thousandths of a second.

Path 22 is the path of the reflected wave resulting from shot 1 which it is desired to record. This wave travels downwardly and is reflected back toward the detector by interface 6. A third path of waves resulting from shot 1 is indicated at 24. This is a ghost which is reflected at interface 4 and interface 6. Many other reflections can take place; for example, a wave could be reflected by the earth's surface, and subsequently reflected by any interface below the surface. Such reflections are also eliminated by this invention.

The path of the desired reflection resulting from shot 2 is indicated at 26, and the path of a ghost reflection resulting from shot 2 is indicated at 28. Most of the ghosts resulting from the first shot have corresponding ghosts resulting from the second shot. Ghosts reflected from the same interfaces are paired, and, in accordance with the invention, one ghost of the pair is caused to cancel the other ghost of the pair. If a reflecting interface exists between the shot levels, certain ghosts resulting from the lower shot will not have corresponding ghosts resulting from the upper shot. These ghosts, accordingly will not be eliminated on the final record. For this reason, it is desirable to avoid placing the shots on either side of a reflecting interface.

$D_1$ is the distance between the detector level and interface 4, which is indicated here as the bottom of the weathered layer, which usually causes ghost reflections of substantial magnitude. $D_2$ is the distance between interface 4 and the level at which shot 2 is detonated. $D_4$ is the distance between the level at which shot 1 is detonated and interface 6 at the top of the formation causing the desired reflections. In order to describe the relative arrival times of the various waves at the detector, distance $D_1$ through $D_4$ will be used.

Referring first to the direct path 10, the wave traveling along this path passes through distances $D_1+D_2+D_3$, and the time required for this wave to reach the detector is, therefore:

$$T_1 = \frac{1}{V_1}D_1 + \frac{1}{V_2}(D_2+D_3)$$

wherein:

$V_1$ is the average velocity for travel of the wave in the formation between the surface of the earth and interface 4; and $V_2$ is the average velocity of the wave in the formation between interface 4 and interface 6.

The time required for the primary reflection resulting from the shot 1 to reach the detector along path 22 is:

$$T_2 = \frac{1}{V_1}D_1 + \frac{1}{V_2}(2D_4 + D_2 + D_3)$$

The time required for the ghost reflection resulting from shot 1 to reach the detector along path 24 is:

$$T_3 = \frac{1}{V_1}D_1 + \frac{1}{V_2}(3D_3 + 3D_2 + 2D_4)$$

The time required for a wave to travel along path 20 from the position of shot 2 to the detector is:

$$T_4 = \frac{1}{V_1}D_1 + \frac{1}{V_2}D_2$$

The time required for the desired reflection resulting from shot 2 to travel along path 26 is:

$$T_5 = \frac{1}{V_1}D_1 + \frac{1}{V_2}(2D_3 + 2D_4 + D_2)$$

The ghost reflection resulting from shot 2 passes to the detector along path 28 in time:

$$T_6 = \frac{1}{V_2}D_1 + \frac{1}{V_2}(3D_2 + 2D_3 + 2D_4)$$

The desired reflection from shot 1 precedes the ghost resulting from shot 1 by a time determined by subtracting $T_2$ from $T_3$:

$$T_3 - T_2 = \frac{2}{V_2}(D_2 + D_3)$$

The desired reflection from shot 2 precedes the ghost resulting from shot 2 by a time determined by subtracting $T_5$ from $T_6$:

$$T_6 - T_5 = \frac{2}{V_2}D_2$$

It is easily seen that, if the direct signals are aligned, the ghosts will also be aligned since the ghost resulting from shot 1 follows the direct signal from shot 1 by a certain time interval, and the ghost resulting from shot 2 follows the direct signal from shot 2 by the same interval:

$$T_3 - T_1 = T_6 - T_4$$

Although the ghosts will be aligned when the direct signals are aligned, the corresponding desired signals will be separated on the records by a time interval, and the direct signal from shot 1 precedes the direct signal from shot 2 by $2D_3/V_2$.

$$[T_5 - T_4] - [T_2 - T_1] = \frac{2D_3}{V_2}$$

In accordance with the invention, a separate record is made for each shot, and provisions are made for aligning the records with respect to each other when the records are being read. In order to cause the ghosts on the record of shot 1 to be aligned with the ghosts on the record of shot 2, the direct wave resulting from shot 1 must be positioned so that, during simultaneous reading of the records, the direct wave resulting from shot 1 is read at the same time as the direct wave resulting from shot 2. The corresponding ghosts will necessarily be aligned with one another, and the desired reflections will be separated.

Alternatively, the electrical signal causing the detonation of each shot can be recorded on the record, and the records can be aligned so that the detonation signal for shot 1 precedes the detonation signal for shot 2 by a time duration of $D_3/V_2$ while the records are read simultaneously. The total time shift required is divided equally between the two records to maintain the same average time of arrival of events on the final record.

Figure 2:
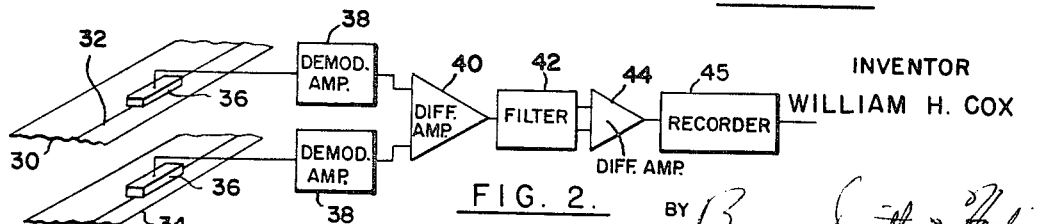
FIGURE 2 is a block diagram of the apparatus according to this invention.

Referring to FIGURE 2, a magnetic tape 30 is shown, which carries in a track indicated at 32 the record of shot 1. Tape 34 carries the record of shot 2. A pair of recording heads 36 extract the information from the tapes, and the output of each recording head is received by a demodulator and amplifier combination 38. The outputs of the demodulator and amplifier combinations 38 are fed to the respective input terminals of a differential amplifier 40, the output of which is a combination of the seismic records, one being subtracted from the other. The output of differential amplifier 40 is fed to a special filter 42 which will later be described in detail. Filter 42, in combination with differential amplifier 44, restores the distorted waveform resulting from the subtraction of one desired signal from the record of shot 1 from the corresponding desired signal for the record of shot 2 with a time displacement therebetween. The output of filter 44 is recorded by recorder 45 to produce a final record.

Figure 4:
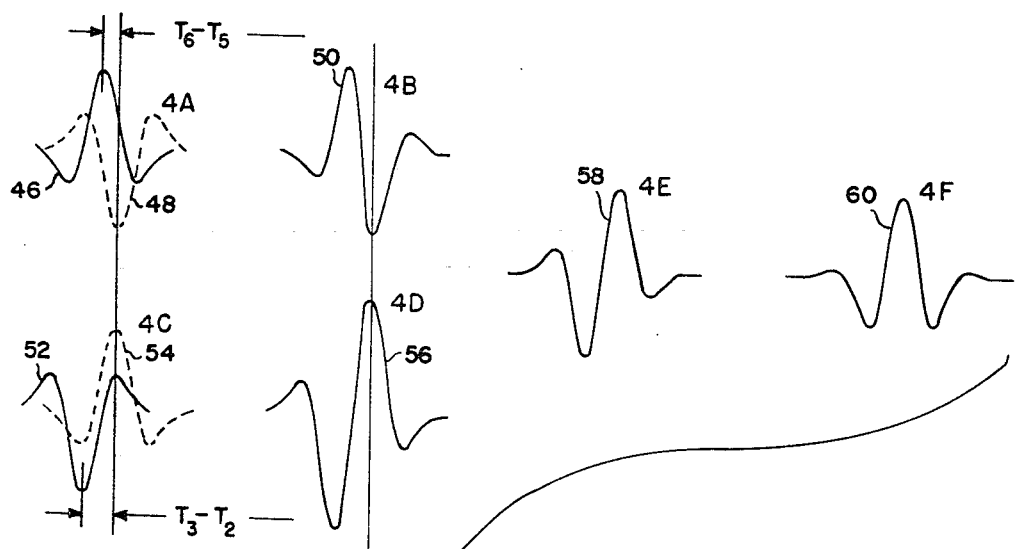
FIGURES 4A, 4B, 4C, 4D, 4E and 4F are graphical illustrations of various waveforms which will serve to illustrate the operation of the invention.

FIGURE 4 illustrates the operation of the apparatus diagrammed in FIGURE 2. The desired signal resulting from shot 2 is indicated in FIGURE 4A at 46, and a ghost resulting from shot 2 is indicated at 48. The shapes of these waves are approximately the same, but they are opposite in polarity because the desired signal has been reflected an odd number of times, and the ghost has been reflected an even number of times. Wave 50 (FIGURE 4B) appears on the record as a result of shot 2, and represents the additive combination of waves 46 and 48. The time displacement between reflection 46 and ghost 48 is indicated by the time difference between centers of symmetry, the time difference for the case of shot 2 being $T_6 - T_5$.

The primary reflection from shot 1 is indicated, in tion of frequency components is $2A(\omega)$ (sin $\omega\Delta t$), and 48, is indicated at 54. These reflections are shown with their polarities inverted to illustrate the subtraction which subsequently takes place. The time duration between the centers of symmetry of the primary reflection and the ghost is $T_3 - T_2$, this time duration being greater than $T_6 - T_5$, by $2D_3/V_2$. When ghosts 48 and 54 are aligned, primary reflections 46 and 52 are out of alignment by $2D_3/V_2$. The additive combination of reflection 52 and ghost 54 is indicated at 56 in FIGURE 4D.

Wave 56 is subtracted from wave 50 by means of differential amplifier 40.

The resultant of wave 50 and wave 56 is shown in FIGURE 4E as wave 58, which is a skew function, having odd symmetry and containing no components resulting from ghosts 48 and 54. These ghosts cancel each other in the differential amplifier.

The output of differential amplifier 44 is indicated, in FIGURE 4F, as wave 60. Wave 60 is merely wave 58 having been restored to the desired form, and it will be noted that wave 60 is recognizable as a desired reflection. In order to understand the operation of filter 42 in restoring wave 58, it must be considered what occurs when a pair of identical waves are subtracted from each other when they are displaced in time.

The reflections $F_1(t)$ and $F_2(t)$ can be expressed as Fourier integrals involving the sum of an infinite number of frequency components. As mentioned previously, the time displacement of these reflections, when spurious signals are aligned, will be twice the difference between the uphole times for the first and second shots. If the difference between the uphole times is expressed as $\Delta t$, the first and second reflections are spaced by $2\Delta t$ and can be conveniently expressed as functions of time by:

(1)
$$F_1(t) = \int_{-\infty}^{\infty} A(\omega) e^{j\omega(t+\Delta t)} d\omega$$

and (2)
$$F_2(t) = \int_{-\infty}^{\infty} A(\omega) e^{j\omega(t+\Delta t)} d\omega$$

Where:

A($\omega$) is a distribution function describing the frequency components of each reflection; and $\Delta t$ is the difference between the uphole times and is equal to half the time separation between the desired reflections.

When these signals are subtracted, the resultant is:

(3) $F_1(t) - F_2(t) = \int_{-\infty}^{\infty} A(\omega)[e^{j\omega(t+\Delta t)} - e^{j\omega(t-\Delta t)}]d\omega$ Simplifying, we obtain:

(4) $F_1(t) - F_2(t) = \int_{-\infty}^{\infty} A(\omega)[e^{j\omega t}e^{j\omega \Delta t} - e^{j\omega t}e^{-j\omega \Delta t}]d\omega$ or (5) $F_1(t) - F_2(t) = \int_{-\infty}^{\infty} A(\omega)e^{j\omega t}[e^{j\omega \Delta t} - e^{-j\omega \Delta t}]d\omega$ Multiplying Equation 5 by $2j/2j$, we obtain:

(6) $F_1(t) - F_2(t) = \int_{-\infty}^{\infty} 2A(\omega)je^{j\omega t}\left[\frac{e^{-j\omega \Delta t} - e^{j\omega \Delta t}}{2j}\right]d\omega$ From Equation 6, it is observed that the new distribution of frequency components is $2A(\omega)(\sin\omega\Delta t)$, and the frequency components, since there is a multiplication by $j$, are shifted 90°. Thus, the amplitude distribution of the frequency components is modified by a sine function of frequency and each component is shifted by 90°.

Figure 3:
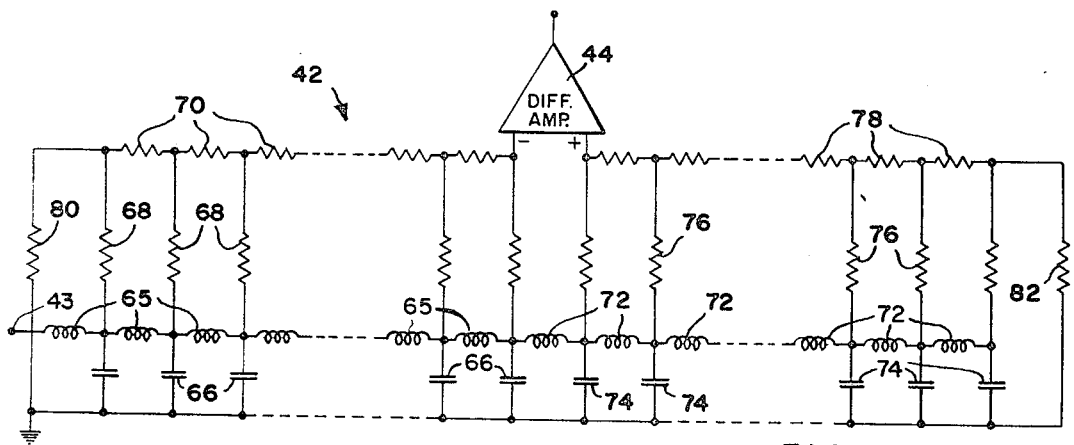
FIGURE 3 is a schematic diagram of a special filter used in accordance with this invention.

In order to recover a wave in its original form from the resultant by the use of a filter, the filter must shift the phase of each component of frequency by 90°, and it must alter amplitudes inversely to the alteration due to subtractive mix. Filter 42, shown in detail in FIGURE 3, corrects phase exactly, and approximately corrects amplitude distortion.

Filter 42 makes the necessary corrections to a pulse applied to its input terminal 43 to restore it to the desired form. The filter includes a delay line comprising a plurality of inductors 65 connected in series, with a capacitor 66 connecting each junction between inductors 65 to 66 to ground. At each junction between inductors 65, there is provided a resistor 68, the other end of which is connected to a junction in a series of resistors 70. The series of resistors 70 terminates at a terminal of differential amplifier 44. The delay line is continued by inductors 72 and capacitors 74. The junctions of inductors 72 are connected to the other terminal of differential amplifier 44 through a resistive ladder network comprising resistors 76 and resistors 78. A terminating resistor 80 connects the near end of the series of resistors 70 to ground, and a terminating resistor 82 similarly connects the far end of the series of resistors 78 to ground.

Figure 8:
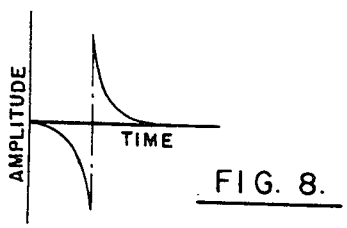
FIGURE 8 shows the impulse response of the filter.

Inductors 65 and capacitors 66 form a uniform electrical delay line. The total time delay is made equal to the longest period of the signal components encountered. The bandwidth and its related delay are chosen for the required signal range according to well-known design procedures. See, for example, Wallis, "Design of Low Frequency Constant Time Delay Lines," A.I.E.E. Transactions, vol. 71, part 1, 1952, pp. 135-140. The delay line is terminated in its characteristic impedance in order to avoid reflection. The resistive ladder networks sample, attenuate and combine the signal at each section of the delay line. Sampling resistors 68 and 76 are large enough to produce negligible loading of the delay line. These resistors can all have the same value, and they can be graded to compensate for losses at the delay line. The characteristic of the filter is such that the output resulting from an electrical impulse applied to its input increases exponentially in negative amplitudes from a very small negative value, suddenly switches polarity at the same amplitude, and decreases exponentially to a very small positive value. This form of impulse response is shown as a function of time in FIGURE 8. The rate of exponential decay produced by each of the networks in the filter is altered in order to compensate for losses. Terminating resistors 80 and 82 enable the ladder networks to produce uniform exponential decay.

The necessary 90° phase shift of the frequency components of an input pulse is concomitant with the production of an impulse response in the form of a skew function of the type described.

Phase correction has the greatest effect in restoring the original signal, and this is done exactly by the filter. However, since subtractive mixing of the two reflections results in amplitude distortion, the filter must also make amplitude corrections. Exact amplitude correction is, in the first place, not practical since subtractive mixing cancels certain frequency components altogether. But, these canceled frequencies can be made to fall outside the useful signal range. Deviations in relative amplitudes of the frequency components have much less effect on wave form than changes in phase. The filter does, however, make approximate corrections for amplitude distortion.

The amplitude distortion resulting from subtractive mixing of two approximately identical wavelets is described by Equation 6 above, which shows that the original spectrum of the wavelet is multiplied by $2 \sin \omega \Delta t$. In order to correct amplitude distortion, therefore, ideally the spectrum of the distorted wavelet should be multiplied by $1/\sin \omega \Delta t$. (The factor 2 can be ignored.)

It is, of course, impossible to achieve this response since the filter would be required to multiply certain frequencies by infinity.

A good approximation to ideal response over the useful frequency range can be accomplished by a practical filter, the frequency of which approximates $1/\omega$ over a wide range. A filter having such a response characteristic will produce the best correction for amplitude distortion where two signals are subtracted from each other with a small time displacement, and will produce satisfactory correction of amplitude distortion over a wide range of time displacement.

Figure 5:
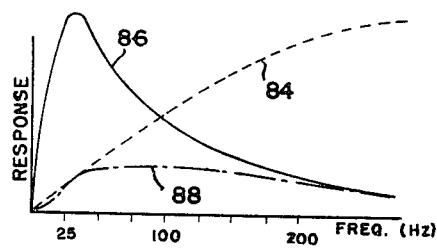
FIGURES 5, 6 and 7 are diagrams of characteristics of a filter which may be used in accordance with the invention, having multiplying functions of the input and output spectra superimposed.

Referring to FIGURE 5, curve 84 represents the variation of the spectrum of a reflection as a result of a particular time displacement between the two direct reflections, the displacement being in this case 0.002 second. Curve 84 is not the spectrum itself, but is the function by which the spectrum is multiplied as a result of subtractive mixing. This multiplying function as is apparent from Equation 6, above, is a sine function.

Curve 86 is the filter response. As frequency increases, the response builds up rapidly to a peak at approximately 25 Hz. and drops off slowly as frequency increases further. Curve 88 is the product of curves 84 and 86 and represents amplitude distortion in the output of the filter. In the ideal case of perfect correction of amplitude distortion, curve 88 would be a straight horizontal line. In this case curve 88 is practically horizontal at frequencies above about 25 Hz., and represents excellent correction of amplitude distortion. Frequencies below 25 Hz. have relatively little significance in determining the shape of a wavelet.

Figure 6:
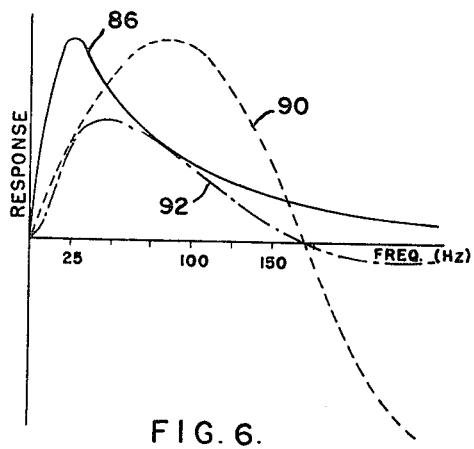

If, with the same filter, the time displacement of the two identical reflections is changed to 0.006 second, the amplitude distortion is represented by curve 90 in FIGURE 6. Again, this curve is a sine function, but since the time displacement is greater, this function varies more rapidly through the frequency spectrum. The product of curve 86 and 90 is curve 92, and it represents less correction of amplitude distortion than does curve 88. The correction still results in a satisfactory restoration of the pulse.

Figure 7:
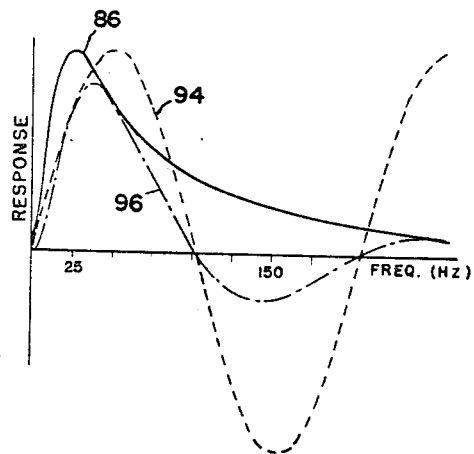

Curve 94 in FIGURE 7 corresponds to a time displacement of 0.010 second, and curve 96, which is the product of curve 94 and curve 86 represents still less amplitude correction, but it is to be noted that the result achieved is still in the nature of a correction. The response 96 is peaked in the useful range, and output components having negative polarity are reduced. This yields the best approximation to the input waveform.

It is possible to use filters of types other than that of filter 42, and filters may be designed to produce the required phase and amplitude corrections, which do not require a differential amplifier to effect polarity reversal.

Filter 42 is a general purpose filter, and, although it produces useable results, it may be desirable, particularly in extended operations involving a fixed difference between shot depths, to use a digital filter in place of filter 42. A digital filter can be readily designed to produce satisfactory results for a particular shot depth difference, and the amplitude correction may be better than that produced by the general purpose filter, particularly if a different filter is designed for each shot depth difference.

In accordance with this invention, a final record is produced from the output of the filter by using the filter output to modulate a carrier and recording the modulated carrier on magnetic tape. The final record is free of ghosts resulting from reflections from interferences above the shot depths, and may be more easily analyzed.

The process of this invention can be applied to a large group of input traces by dividing the group into pairs of traces, each trace of a pair being subtracted electrically from the other trace of the pair. The resulting signals may then be mixed and filtered to produce a single output trace.

The process of the invention can also be applied to records made from shots in shot holes at different locations or from successive shots made at the same locations and detected at different locations. When records of the shots are reproduced simultaneously, they are adjusted so that corresponding unwanted signals are aligned and appear simultaneously as electrical signals. The signals are subtracted from each other to cancel the undesired components, but because of the difference in paths, the desired reflections are not aligned and do not cancel. A distorted signal is produced which is corrected by the filter. Multiple reflections can be eliminated from the final record by this method. When the multiple reflections are aligned on the records for successive shots, the corresponding primary reflection will be separated in time since the average velocity for a multiple will be different from that of a primary reflection which penetrates to a greater depth.

The invention can be applied wherever the time difference between a desired signal and an unwanted signal resulting from one shot is different from the time difference between a corresponding desired signal and a corresponding unwanted signal resulting from a second shot.

It will be apparent that various modifications may be made to the process of this invention and that many alternatives are open with regard to the nature of the apparatus used, without departing from the scope of the invention as defined in the following claims.

I claim:

1. A method of producing seismic records comprising the steps of establishing points for the firing of a plurality of shots, establishing points for the detection of seismic signals produced by said shots, said points being chosen so that the paths of travel of signals resulting from first and second shots from the respective shot points to the respective detection points are different, firing a first shot, detecting the seismic signals produced by said first shot and producing a first electrical signal in response thereto, firing a second shot, detecting the seismic signals produced by said second shot and producing a second electrical signal in response thereto, effecting a delay in one of said electrical signals with respect to the other so that corresponding undesired portions of said electrical signals occur simultaneously, subtracting one of said electrical signals from the other of said electrical signals to produce a third electrical signal, effecting a 90° phase shift of each frequency component of said third electrical signal to produce a fourth electrical signal, and recording said fourth electrical signal.

2. A method according to claim 1 including the step of selectively altering the amplitudes of the frequency components of said third electrical signal by filtering said third electrical signal in a filter having a frequency response which, in the range of frequencies having significance in determining the shape of a seismic wavelet, is approximately proportional to the reciprocal of the sine of the product of frequency and one-half of a time displacement of the order of the time displacement between the desired signals when said undesired portions of said electrical signals occur simultaneously.

3. A method according to claim 1 including the step of selectively altering the amplitudes of the frequency components of said third electrical signal by filtering said third electrical signal in a filter having a frequency response which, in the range of frequencies having significance in determining the shape of a seismic wavelet, is approximately proportional to the reciprocal of its input frequency.

4. A method of producing seismic records comprising the steps of detonating a first explosive charge at first depth below the earth's surface, detecting at a remote point the seismic signals produced by the detonation of said first explosive charge and producing a first electrical signal corresponding to said seismic signals, detonating a second explosive charge at a second depth below the earth's surface, detecting the seismic signals produced by the detonation of said second explosive charge and producing a second electrical signal corresponding to the last-mentioned seismic signals, effecting a delay in said first electrical signal so that corresponding undesired portions of said electrical signals occur simultaneously, subtracting one of said electrical signals from the other of said electrical signals to produce a third electrical signal, effecting a 90° phase shift of each frequency component of said third electrical signal to produce a fourth electrical signal and recording said fourth electrical signal.

5. A method according to claim 4 including the step of selectively altering the amplitudes of the frequency components of said third electrical signal by filtering said third electrical signal in a filter having a frequency response which, in the range of frequencies having significance in determining the shape of a seismic wavelet, is approximately proportional to the reciprocal of its input frequency.

6. A method according to claim 4 in which said steps of detecting are each followed by recording said electrical signals on separate recording media, and said step of effecting a delay in said first electrical signal comprises the step of simultaneously producing said electrical signals from both said media at a predetermined time relationship.

7. An apparatus for producing seismic records comprising means providing an electrical signal corresponding to the seismic signals resulting from a first shot, means providing a second electrical signal corresponding to the seismic signals produced by a second shot, means for adjusting the time relationship of said electrical signals with respect to each other, means receiving said electrical signals from said means providing said electrical signals and subtracting one from the other to provide a third electrical signal, filtering means receiving said third electrical signal and shifting the phase of each frequency component of said third electrical signal by 90°, and recording means receiving the output of said filtering means and producing a record thereof.

8. An apparatus according to claim 7 in which said filtering means has a frequency response which, in the range of frequencies having significance in determining the shape of a seismic wavelet, is approximately proportional to the reciprocal of its input frequency.

9. An apparatus according to claim 7 in which said filtering means includes a delay line having a plurality of taps in two groups, the first of said groups being toward one end of said delay line and the other of said groups being toward the other end of said delay line, a differential amplifier having a first and a second input, resistive means connecting said first group of taps to said first input, resistive means connecting said second group of taps to said second input, the resistance between the taps of each of said group and their corresponding inputs increasing progressively toward the ends of said delay line, and the output of said filtering means being taken at the output of said differential amplifier.

10. An apparatus according to claim 7 in which both said means providing electrical signals include records of said seismic signals and recording heads providing electrical outputs in response to the information on said records.

References Cited

Hammond: Ghost Elimination From Reflection Records, in Geophysics, vol. XXVII, No. 1, February 1962, pp. 48–60.

RODNEY D. BENNETT, *Primary Examiner.*

D. C. KAUFMAN, *Assistant Examiner.*

UNITED STATES PATENT OFFICE
CERTIFICATE OF CORRECTION

Patent No. 3,408,622                                  October 29, 1968

William H. Cox

It is certified that error appears in the above identified patent and that said Letters Patent are hereby corrected as shown below:

Column 6, line 36, "tion of frequency components is 2A (ω) (sinωΔt), and" should read -- FIGURE 4C, at 52, and a ghost, corresponding to ghost --; lines 73 to 75, the equation should appear as shown below:

$$F_2(t) = \int_{-\infty}^{+\infty} A(\omega) e^{j\omega(t-\Delta t)} d\omega$$

Column 7, lines 20 to 22, the equation should appear as shown below:

$$F_1(t) - F_2(t) = \int_{-\infty}^{+\infty} 2A(\omega) j e^{j\omega t} \left[ \frac{e^{j\omega \Delta t} - e^{-j\omega \Delta t}}{2j} \right] d\omega$$

Signed and sealed this 10th day of March 1970.

(SEAL)
Attest:

EDWARD M. FLETCHER, JR.
Attesting Officer

WILLIAM E. SCHUYLER, JR.
Commissioner of Patents